(12) United States Patent
Geis

(10) Patent No.: US 10,412,180 B2
(45) Date of Patent: Sep. 10, 2019

(54) HOUSEHOLD GRAPHING SYSTEM

(71) Applicant: Tru Optik Data Corp, Stamford, CT (US)

(72) Inventor: Alexander Geis, Manhasset, NY (US)

(73) Assignee: Tru Optik Data Corp., Stamford, CT (US)

( * ) Notice: Subject to any disclaimer, the term of this patent is extended or adjusted under 35 U.S.C. 154(b) by 5 days.

(21) Appl. No.: 14/707,802

(22) Filed: May 8, 2015

(65) Prior Publication Data
US 2015/0326454 A1    Nov. 12, 2015

Related U.S. Application Data

(60) Provisional application No. 61/990,554, filed on May 8, 2014.

(51) Int. Cl.
| G06F 15/16 | (2006.01) |
| H04L 29/08 | (2006.01) |
| H04L 12/26 | (2006.01) |
| G06N 5/04 | (2006.01) |
| H04W 4/21 | (2018.01) |
| H04L 29/06 | (2006.01) |

(52) U.S. Cl.
CPC ............... *H04L 67/22* (2013.01); *G06N 5/04* (2013.01); *H04L 43/04* (2013.01); *H04L 67/1036* (2013.01); *H04L 67/1063* (2013.01); *H04L 67/30* (2013.01); *H04L 63/20* (2013.01); *H04W 4/21* (2018.02)

(58) Field of Classification Search
None
See application file for complete search history.

(56) References Cited

U.S. PATENT DOCUMENTS

| 2006/0020662 A1* | 1/2006 | Robinson | G06F 15/16 709/203 |
| 2010/0306773 A1* | 12/2010 | Lee | G06F 9/5077 718/1 |
| 2011/0238828 A1* | 9/2011 | Grigsby | H04L 67/104 709/224 |
| 2013/0007218 A1* | 1/2013 | Shah | H04L 45/302 709/219 |
| 2014/0025728 A1 | 1/2014 | Chopra et al. | |
| 2014/0032650 A1* | 1/2014 | Singh | H04L 41/00 709/203 |
| 2014/0289862 A1* | 9/2014 | Gorfein | G06F 21/10 726/26 |

OTHER PUBLICATIONS

"BitTorrent Swarm Analysis through Automation and Enhanced Logging" by Razvan et al. pp. 52-65.*

(Continued)

*Primary Examiner* — Phuoc H Nguyen
(74) *Attorney, Agent, or Firm* — Goodwin Procter LLP

(57) ABSTRACT

A torrent to monitor may be determined and peer activity of a swarm associated with the torrent may be monitored. Data collection or data distribution statistics for the swarm may be calculated and used to create profiles for peers in the swarm based on their role in data collection or data distribution. Swarm behavior may be predicted based on the created peer profiles.

19 Claims, 5 Drawing Sheets

EXEMPLARY TTP PEER ANALYZING (PA) COMPONENT

(56) References Cited

OTHER PUBLICATIONS

"Identifying, Analyzing, and Modeling Flashcrowds in BitTorrent" by Boxun et al. pp. 1-25.*
Hybelius Roland et al. Appendix B: User's Manual, Feb. 18 2010 [online]. Retrieved from the Internet: <URL: http:uu.divaportal.org/smash/get/diva2:297971/FULLTEXT01.pdf>, p. 8, par. 4.3 Tracker.
International Search Report and Written Opinion issued in related international application No. PCT/US2015/029887, dated Sep. 24, 2015.

\* cited by examiner

EXEMPLARY TTP TORRENT ANALYZING (TA) COMPONENT

EXEMPLARY TTP PEER ANALYZING (PA) COMPONENT

EXEMPLARY TTP SWARM BEHAVIOR ANALYZING (SBA) COMPONENT

HOUSEHOLD GRAPHING SYSTEM

CROSS-REFERENCE TO RELATED APPLICATIONS

Applicant hereby claims priority under 35 U.S.C. § 119 to U.S. provisional patent application No. 61/990,554, filed May 8, 2014, entitled "TRU TORRENT PLATFORM METHODS, APPARATUSES AND MEDIA."

This disclosure describes TRU TORRENT PLATFORM METHODS, APPARATUSES AND MEDIA (hereinafter "TTP"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

The entire contents of the aforementioned application are herein expressly incorporated by reference in their entirety.

FIELD

The present disclosure is directed generally to data analysis platforms.

BACKGROUND

A variety of data may be collected via the Internet. Websites may track visitors and visitors' browsing behaviors. Online stores may track shoppers' purchasing history, wish lists, and responses to offers. Social networks may track users' connections, likes, and interests.

BRIEF DESCRIPTION OF THE FIGURES

The accompanying figures and/or appendices illustrate various exemplary embodiments in accordance with the present disclosure.

APPENDICES 1-2 illustrate additional exemplary embodiments of the TTP.

DETAILED DESCRIPTION

Introduction

The BitTorrent protocol is responsible for a significant amount of worldwide Internet traffic in the realm of peer to peer sharing. Unfortunately, the majority of this traffic tends to be referred to in a negative context due to its association with multimedia and software piracy. Regardless, the amount of raw information generated from torrent transactions continues to grow each year in proportion to the overall worldwide growth of Internet traffic.

Due to the negative scrutiny of BitTorrent traffic, there is a fundamental lack of comprehensive tools that both track and analyze the motion of data throughout the torrent network, as well as an equally lacking interest in building such tools. Torrent data is different than other types of data on the Internet today, as it follows a different demographic of users and focuses on specific types of media. As a result, the amount of information that can be provided by analyzing a torrent network would not only be significant, but also unique and valuable as it fills in the gaps of big data analytics that social media is not able to address.

The TTP targets torrent networks to aggregate and analyze torrent data, cross reference such data with other data (e.g., social media data, market specific data, general communication data), and utilize resulting information in applications such as audience segmentation, audience profiling, ad targeting, personalized content management, personalized content recommendations, understanding demand for content, understanding release timing, understanding how to focus marketing efforts, understanding value of licensing deals, understanding value of syndication, and/or the like.

Detailed Description of the TTP

Figure 1:
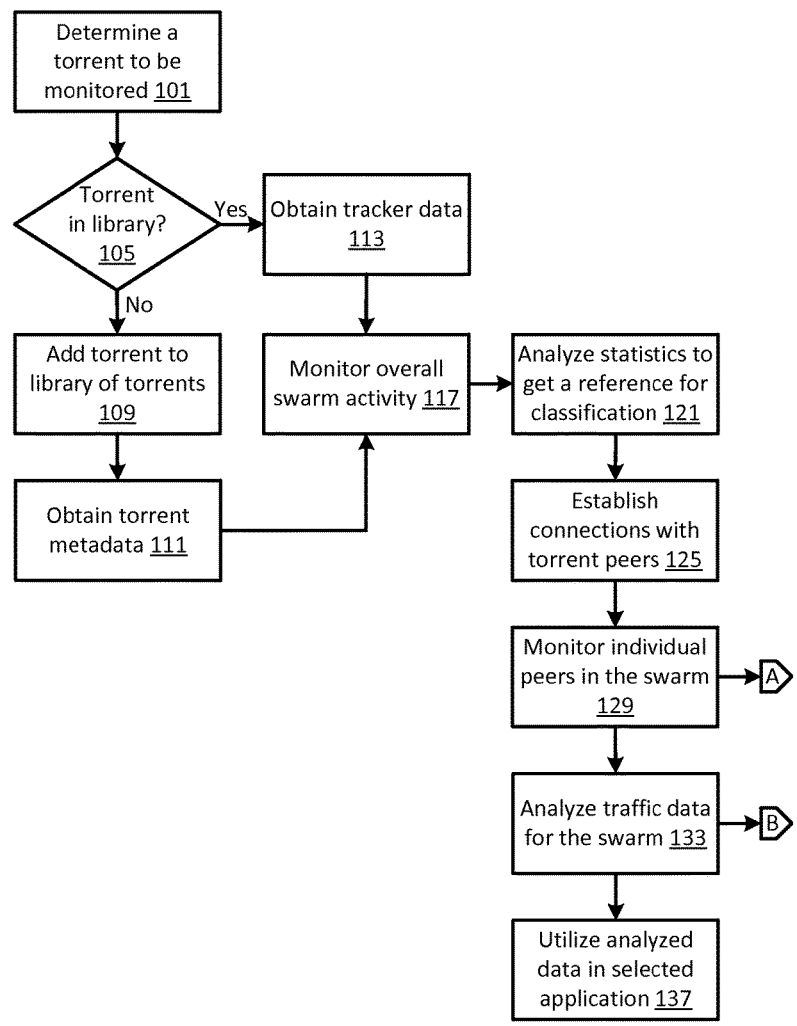
FIG. 1 shows a logic flow diagram illustrating a torrent analyzing (TA) component in one embodiment of the TTP.

FIG. 1 shows a logic flow diagram illustrating a torrent analyzing (TA) component in one embodiment of the TTP. In FIG. 1, a torrent to be monitored may be determined at 101. In one embodiment, the torrent may be specified by a TTP user. For example, a movie studio may wish to understand demand for a particular movie. Accordingly, a torrent associated with the movie may be selected for monitoring by the TTP user. In another embodiment, the torrent may be selected automatically by the TTP. For example, a music publishing company may wish to understand the audience of a new song. Accordingly, the TTP may search for torrents associated with the song and monitor such torrents. In one implementation, trackers may be utilized to find appropriate torrents. In another implementation, a search engine that indexes trackerless torrents may be utilized to find appropriate torrents.

A determination may be made at 105 whether the torrent is already in the library of torrents monitored by the TTP. For example, such a determination may be made by checking the torrents data store 530c (e.g., via one or more SQL queries). If the torrent is not already in the library of torrents, the torrent may be added to the library of torrents at 109. In various implementations, this may involve assigning an identifier to the torrent, categorizing the torrent (e.g., based on content type (e.g., movie, music), content genre (e.g., comedy, drama), based on language associated with the content of the torrent, based on size), setting a priority for the torrent (e.g., the amount of resources that should be devoted to tracking the torrent), and/or the like. Metadata associated with the torrent may be obtained at 111. In one implementation, torrent metadata may be obtained via a .torrent file. The metadata may include information such as torrent filename, torrent hash, torrent size, number of torrent pieces, tracker data (e.g., a list of IP addresses of peers that may have torrent pieces), and/or the like. If the torrent is already in the library of torrents, updated tracker data may be obtained (e.g., from trackers, from other nodes utilizing BitTorrent's Distributed Hash Table (DHT) protocol) at 113. In one embodiment, a peer may be a computer system using the BitTorrent protocol for sharing torrent data (e.g., via TCP) with other peers, and a node may be a computer system using the DHT protocol for sharing locations (e.g., IP addresses and/or ports) of peers having torrent data (e.g., via UDP) with other nodes. It is to be understood that a computer system may be both a peer and a node (e.g., a torrent client associated with the computer system may include a DHT node). In one implementation, the DHT protocol may be utilized to find peers sharing the torrent. For example, DHT data (e.g., IP address and torrent hash) may be collected from a DHT node and analyzed to determine peers sharing the torrent. DHT nodes associated with the determined peers may in turn be contacted and their DHT data may be collected and analyzed iteratively (e.g., for a predetermined period of time, until the number of newly discovered peers during an iteration is below a specified threshold).

Overall swarm activity may be monitored at 117. In one embodiment, information regarding peers associated with the torrent may be monitored. In one implementation, tracker data may be compared with information regarding peers with which the TTP is actually able to connect to determine the correspondence between tracker based and/or DHT protocol based peer numbers and actual peer numbers. Since tracker data tends to be inaccurate, such analysis may be performed recursively over time to estimate the real number of peers in the swarm associated with the torrent based on tracker data. In another embodiment, information regarding peer activity in the swarm may be monitored. For example, information regarding peer activity may include download and/or upload speeds of peers, information regarding which peers have which torrent pieces, how long peers make torrent pieces available to other peers, information regarding which torrent clients peers use, and/or the like.

Statistics for the swarm (i.e., peers that are actively connected and sharing specific torrent data) may be analyzed at 121. Such analysis may be performed to get a reference for classifying peers based on their role in data collection and/or distribution. For example, averages may be calculated for download and/or upload speeds of peers (e.g., these averages may be used as thresholds, such as to classify peers having above average upload to download ratios as seeders, and peers having above below average upload to download ratios as leechers). In another example, clusters of peers may be determined (e.g., using the k-Nearest Neighbors algorithm) based on download and/or upload speeds of peers (e.g., clusters may be created identifying seeders and/or leechers).

The TTP may establish connections with torrent peers at 125. Such connections may be established in accordance with the BitTorrent protocol. Individual peers in the swarm may be monitored at 129. In one embodiment, transaction data of peers connected with the TTP may be monitored. Such data may be used to create profiles for the peers and/or to classify the peers (e.g., as seeders or leechers). See FIG. 2 for additional details regarding monitoring individual peers in the swarm.

Traffic data for the swarm may be analyzed at 133. Such analysis may be used to predict swarm behavior. In one embodiment, information regarding predicted swarm behavior may be used to determine physical locations for virtual machine instances of TTP torrent servers (e.g., acting as peers, acting as nodes). In another embodiment, information regarding predicted swarm behavior may be cross referenced with other data (e.g., social media data, market specific data, general communication data) to determine relationships between such data. See FIG. 3 for additional details regarding analyzing traffic data for the swarm.

At 137, analyzed data (e.g., cross referenced data) may be utilized in a selected application such as audience segmentation, audience profiling, ad targeting, personalized content management, personalized content recommendations, understanding demand for content, understanding release timing, understanding how to focus marketing efforts, understanding value of licensing deals, understanding value of syndication, and/or the like. In one embodiment, analyzed data (e.g., the number of IP addresses sharing the torrent) may be used to determine (e.g., based on correlation with historical data using a neural network) a desired metric (e.g., the level of demand for content, such as a movie, associated with the torrent that people in a locality, such as Manhattan, are predicted to have) that may be used in a selected application (e.g., understanding demand for content to determine the value of a licensing deal associated with the movie). In another embodiment, analyzed data may be used to determine (e.g., using the k-Nearest Neighbors algorithm) groupings (e.g., localities with different levels of interest in the content associated with the torrent) and/or to perform (e.g., based on correlation with historical data) segmentation analysis (e.g., determine audience segmentation for a locality).

Figure 2:
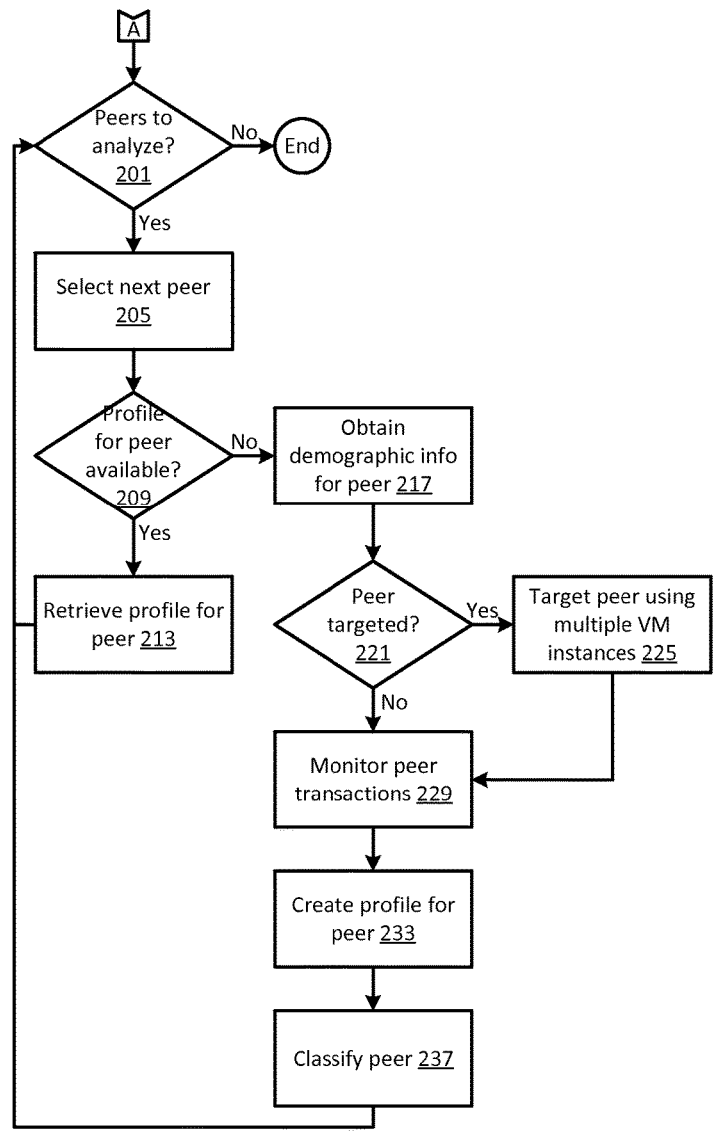
FIG. 2 shows a logic flow diagram illustrating a peer analyzing (PA) component in one embodiment of the TTP.

FIG. 2 shows a logic flow diagram illustrating a peer analyzing (PA) component in one embodiment of the TTP. In FIG. 2, peers connected with the TTP may be monitored. A determination may be made at 201 whether there are peers to analyze. For example, each peer connected with the TTP may be analyzed. If there are peers to analyze, the next peer may be selected for analysis at 205.

A determination may be made at 209 whether a profile is available for the peer. For example, profiles may be stored in the profiles data store 530d. In one embodiment, a profile may be a collection of data about the peer (e.g., the amount and/or type of data that the peer collects, the peer's traffic dynamics) that facilitates quick analysis of the peer's impact on the swarm. In some implementations, the profile may include a classification of the peer based on the peer's role in data collection and/or distribution (e.g., as seeder or leecher). In one embodiment, the profile may be utilized to facilitate efficient analysis and/or prediction of the swarm's behavior. Since a typical peer's profile and traffic dynamics (e.g., seeding and leeching behaviors, upload and download bandwidths) tend to remain fairly constant no matter which torrent swarm a typical peer joins, in one implementation, a profile created for the peer based on the peer's activity in one swarm may be utilized when analyzing the peer's impact on another swarm. Furthermore, in another implementation, a profile for the peer may be created based on the peer's activity in multiple swarms. For example, data regarding the peer's activity in multiple swarms may be combined (e.g., by integrating different types of data obtained from different swarms, by using a weighted average of same types of data obtained from different swarms, by replacing older data with newer data) to generate the profile.

If the peer's profile is available, the peer's profile may be retrieved at 213 (e.g., using one or more SQL queries) and utilized during analysis of the swarm. If the peer's profile is not available or if the peer's profile should be updated (e.g., based on a threshold time period, such as every six months, for refreshing information about the peer) data utilized to create the peer's profile may be collected. Demographic information associated with the peer may be collected at 217. In one embodiment, geolocation data associated with the peer may be collected. In various implementations, geolocation data collection practices such as using raw API GPS data (e.g., to determine geolocation from IP address), geolocational cross referencing of data across social networks (e.g., location specified on various social networks by a person associated with the IP address of the peer), and/or the like may be utilized.

A determination may be made at 221 whether the peer is targeted for data collection. In one embodiment, a torrent may be targeted (e.g., by a TTP user). If there are enough resources (e.g., hardware) to target peers in the swarm associated with the torrent, such peers may be targeted for data collection. If there are not enough resources to target peers in the swarm associated with the torrent, such peers may not be targeted for data collection. In another embodiment, peers having specified profile characteristics may be targeted for data collection. Accordingly, peers exhibiting specified profile characteristics (e.g., in any swarm, in the swarm associated with a specified torrent) may be targeted for data collection.

If the peer should be targeted for data collection, the peer may be targeted using multiple virtual machine instances of TTP torrent servers at 225. In one embodiment, multiple virtual machine instances may be configured with parameters (e.g., seeding and leeching behaviors, available upload and download bandwidths) that make such virtual machine instances look desirable to establish connection with to targeted peers (e.g., based on profile characteristics of such targeted peers and the BitTorrent algorithm). Accordingly, such targeted peers may connect to such virtual machine instances with increased probability. In another embodiment, multiple virtual machine instances configured with different parameters (e.g., different seeding and leeching behaviors, different available upload and download bandwidths) may be utilized to connect with and/or collect data from the peer, and such data may be combined to get a better understanding of the peer's impact on the swarm.

At 229, the peer's transactions may be monitored. For example, transaction data may be stored in the traffic data store 530e. In one embodiment, the peer's IP address and information regarding the peer's activity may be collected. For example, information regarding the peer's activity may include data such as the peer's download and/or upload speeds, which torrent pieces the peer is downloading and/or uploading, how long the peer makes torrent pieces available to other peers, which torrent client the peer uses, and/or the like.

A profile may be created for the peer at 233. In various implementations, profiles may be stored based on the peer's IP address, based on the combination of the peer's IP address and torrent client, and/or the like. The profile may include data regarding the peer collected during monitoring. In one embodiment, data regarding the peer obtained from other sources (e.g., IP address based demographic information obtained from social media websites) may be included as part of the peer's profile.

The peer may be classified at 237. In one embodiment, the peer may be assigned to a discreet group. For example, the peer may be classified as a seeder or a leecher based on the peer's upload to download ratio (e.g., using the calculated statistics for the swarm). In another embodiment, the peer's profile data may be provided to a classifier for classification. For example, the peer's profile data may be provided to a neural network for classification (e.g., the neural network may assign the peer to a group (e.g., the group of peers that are likely to have new content of a specific type or genre), the neural network may calculate a metric (e.g., a swarm influence ranking calculated based on the amount of data uploaded and/or downloaded compared to other peers in the swarm) for the peer).

Figure 3:
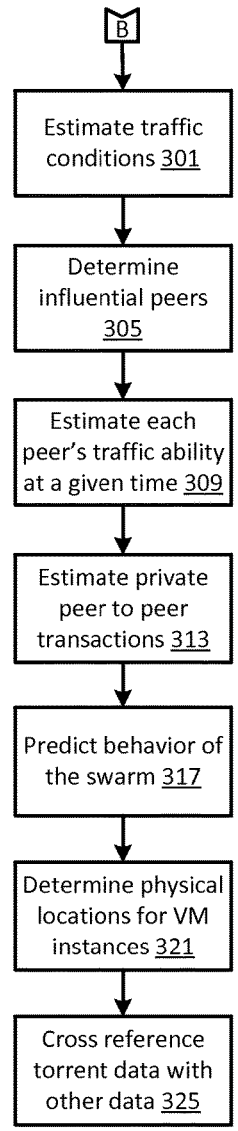
FIG. 3 shows a logic flow diagram illustrating a swarm behavior analyzing (SBA) component in one embodiment of the TTP.

FIG. 3 shows a logic flow diagram illustrating a swarm behavior analyzing (SBA) component in one embodiment of the TTP. In FIG. 3, traffic conditions may be estimated at 301. In one embodiment, profiles of peers in a swarm may be analyzed to determine how each peer is likely to behave in the swarm. For example, the peer's profile may be analyzed to predict whether the peer is likely to behave as a seeder or as a leecher (e.g., based on previous behavior in similar swarms). In another example, the peer's profile may be analyzed to predict the peer's upload and download bandwidths (e.g., based on average upload and download bandwidths in previous transactions). In yet another example, the peer's profile may be analyzed to predict how long the peer is likely to remain in the swarm (e.g., based on behavior of other peers with similar profiles).

Influential peers may be determined at 305. In one embodiment, bandwidth available from virtual machine instances of TTP torrent servers may be varied to facilitate determining which peers in the swarm have large influence on other peers. Virtual machine instances in "cat" mode may seed at high bandwidth speed to engage leeching peers. Virtual machine instances in "mouse" mode may throttle download speeds to engage seeding peers. In one implementation, data regarding traffic dynamics may be collected and analyzed (e.g., to determine how the traffic conditions in the swarm change in response to behavior of virtual machine instances), and influential peers (e.g., peers that upload a lot of data compared with other peers, peers that download a lot of data compared with other peers) may be identified.

At 309, each peer's traffic ability at a given time may be estimated. In one embodiment, conditions that trigger choking (i.e., bandwidth throttling) of a peer who does not reciprocate from a seeding standpoint may be identified. In one implementation, upload bandwidth available from virtual machine instances of TTP torrent servers may be varied and download bandwidth available to the virtual machine instances may be monitored to understand conditions that trigger choking. Each peer's profile may be analyzed to estimate how each peer's traffic ability may be affected by throttling (e.g., based on the peer's likely behavior).

Private peer to peer transactions may be estimated at 313. In one embodiment, a list of estimated private transactions between other peers in the swarm may be created based on the analysis of the progress of leecher downloads. In one implementation, each peer's likely behavior in the swarm, information regarding which peers in the swarm are influential, each peer's estimated traffic ability, and/or the like data may be analyzed with regard to the progress of leecher downloads (e.g., using statistical analysis) to create a list of estimated private transactions. For example, each estimated transaction may have a probability and a margin of error with regard to traffic statistics and/or peers involved in the transaction.

The behavior of the swarm may be predicted at 317. In one embodiment, each peer's likely behavior in the swarm, information regarding which peers in the swarm are influential, each peer's estimated traffic ability, information regarding actual and/or estimated transactions, the number and/or locations of peers in the swarm (e.g., determined based on analyzing torrent data, determined based on analyzing DHT data), and/or the like data may be analyzed to predict the swarm's behavior. For example, the ratio of seeders to leechers in the swarm may be determined, and the speed with which the torrent is likely to spread may be estimated based on historical data regarding swarms of comparable size (e.g., based on a specified percentage difference threshold) with a similar ratio of seeders to leechers. In another example, average upload and download speeds for peers and locations of influential peers may be determined, and the way in which the torrent is likely to spread in different geographic regions may be estimated based on available upload and download capacities in different geographic regions.

At 321, information regarding predicted swarm behavior may be used to determine physical locations for virtual machine instances of TTP torrent servers. In one embodiment, geolocation data may be utilized to determine efficient physical locations for virtual machine instances. For, example, virtual machine instances may be deployed at locations that facilitate efficient peer and/or node connections (e.g., locations that, with regard to network topology, are physically and/or logically close to peers and/or nodes with which the virtual machine interacts).

At 325, information regarding predicted swarm behavior may be cross referenced with other data (e.g., social media data, market specific data, general communication data) to determine relationships between such data. In one embodiment, data may be cross referenced based on a geographic area (e.g., a locality). For example, predicted swarm behavior of peers in Manhattan (e.g., the number of peers in Manhattan that download a torrent associated with a movie) may be cross referenced with social media data regarding people in Manhattan (e.g., the number of people in Manhattan who "tweeted" about the movie on Twitter). Accordingly, such cross referenced data (e.g., the number of peers in Manhattan that download a torrent associated with the movie, and the number of people in Manhattan who "tweeted" about the movie) may be utilized in a selected application (e.g., by providing such cross referenced data as inputs to a neural network trained on historical data that produces an output, such as the number of DVDs of the movie that are predicted to be purchased in Manhattan, for the selected application). In another embodiment, data may be cross referenced per peer (e.g., based on the peer's IP address). For example, the peer's profile information may be cross referenced with website data (e.g., purchases made at a music store from the peer's IP address, Facebook profile associated with the peer's IP address). Accordingly, such cross referenced data (e.g., content of downloaded torrents, purchases made and social network data) may be utilized in a selected application (e.g., to determine which content and/or products to advertise to a user associated with the peer's IP address).

Figure 4:
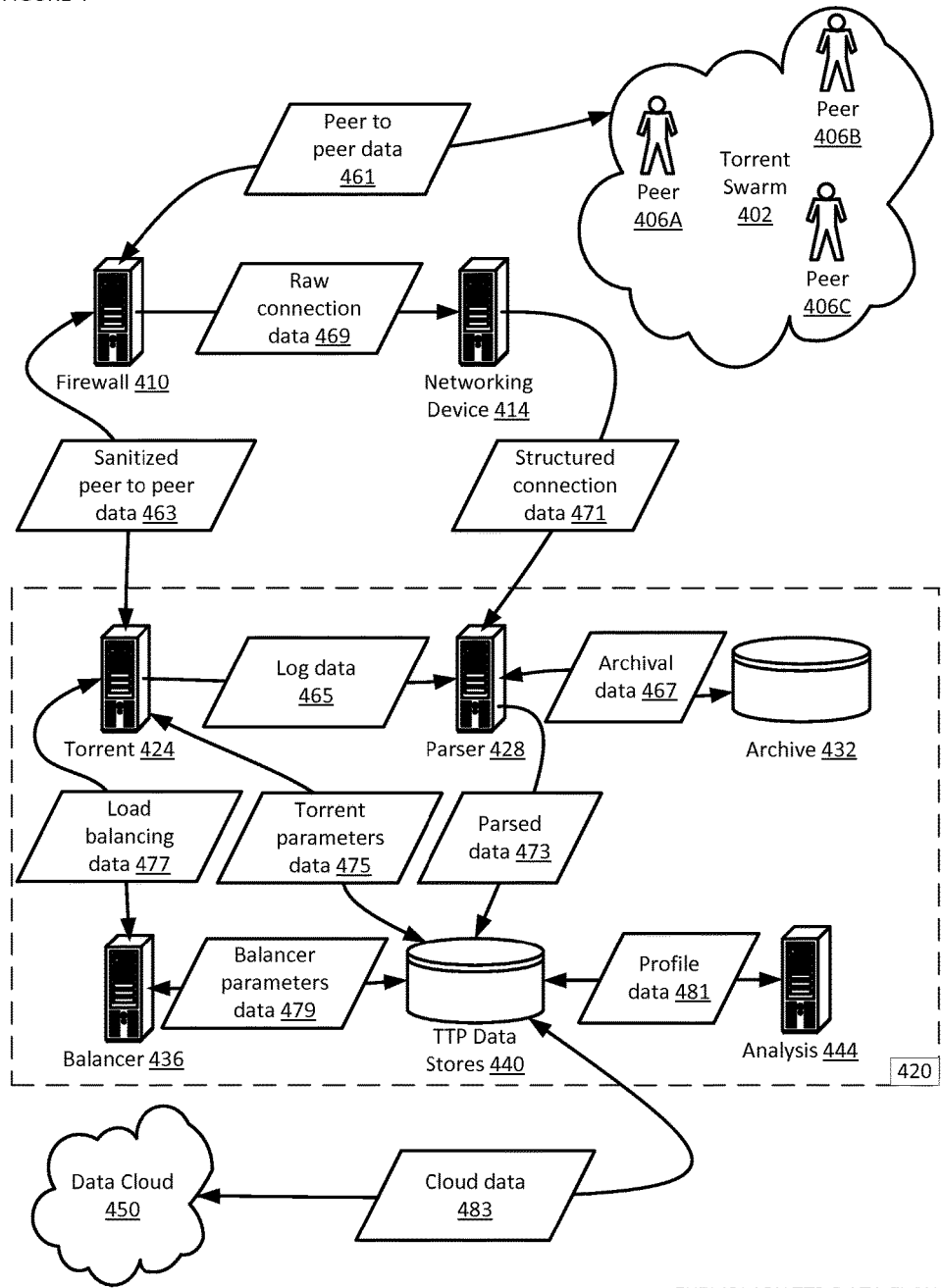
FIG. 4 shows a data flow diagram in one embodiment of the TTP.

FIG. 4 shows a data flow diagram in one embodiment of the TTP. FIG. 4 provides an example of how data may flow to, through, and/or from the TTP. In FIG. 4, a torrent swarm 402 may include peers 406A-406C. For example, the peers may utilize client devices (e.g., desktops, laptops, tablets, smart phones) with BitTorrent clients to upload and download torrent data associated with a torrent.

A firewall 410 may be utilized control the flow of traffic between peers in the torrent swarm and the rest of the TTP instance 420. In some implementations, the firewall may be utilized to control connection count and bandwidth available per torrent server. In some implementations, the firewall may include a plurality of firewall devices working in tandem. In one embodiment, a two-way connection may be established between the firewall and a peer that is trying to communicate with a torrent server, and utilized to transmit peer to peer data 461. The peer to peer data may include actual torrent data. For example, the firewall may be utilized to throttle upload speed to prevent the torrent server from being marked as a seeder to prevent copyright infringement. In one implementation, the firewall may analyze the peer to peer data to determine connection data such as the peer's IP address, data available in Address Resolution Protocol (ARP) packets, the BitTorrent client utilized by the peer, the file name associated with the torrent, the torrent's hash, upload speed, download speed, the time associated with a transaction, and/or the like. In another embodiment, a connection may be established between the firewall and a DHT node (e.g., associated with one of the peers), and utilized to collect DHT data from the node. In one implementation, the firewall may analyze DHT data to determine connection data such as the node's IP address, data available in Address Resolution Protocol (ARP) packets, the torrent's hash, and/or the like.

The firewall may sanitize traffic and send sanitized peer to peer data 463 and/or sanitized DHT data to a torrent server 424. In various implementations, sanitizing traffic may include controlling the number of connections to the torrent server (e.g., reject connections that would exceed the torrent server's capacity), controlling bandwidth to and/or from the torrent server, blocking malicious traffic, and/or the like. In some implementations, the torrent server may include a plurality of virtual machine instances working in tandem. For example, the torrent server may include a plurality of virtual machines acting as peers and/or a plurality of virtual machines acting as nodes. In one implementation, virtual machines acting as peers may participate in the swarm as peers via the firewall using TCP. In another implementation, virtual machines acting as nodes may create outgoing connections to other nodes via the firewall using UDP, analyze DHT data, and iteratively contact newly discovered nodes. In one embodiment, the sanitized peer to peer data may include actual torrent data traded by the torrent server. For example, torrent data size may be capped (e.g., to 10% of the data associated with a torrent file) to prevent copyright infringement. In another embodiment, the sanitized peer to peer data and/or DHT data may include connection data determined by the firewall. For example, connection data may be transmitted in a tab delimited text file format. In one embodiment, the torrent server may restructure connection data into a proper format for logging. For example, the torrent server may restructure connection data into a JSON standards compliant format. Such restructured log data 465 may be sent to a parser 428.

The parser may communicate with an archive 432 to archive log data. In some implementations, the parser may include a plurality of virtual machine instances each handling specific torrent server instances. In one implementation, a connection may be established from the parser instance to the archive instance for each torrent server instance. In one embodiment, log data (e.g., compressed using .ZIP file format) may be sent as archival data 467 to the archive. In another embodiment, archival data may be restored from the archive.

The firewall may send raw connection data 469 to a networking device 414. In one implementation, raw connection data may include connection data from sanitized traffic that was allowed by the firewall and connection data from traffic blocked by the firewall. For example, connection data may be transmitted in a tab delimited text file format. In one implementation, the networking device may be a hardware networking device, such as the nTop nBox Recorder. In another implementation, the networking device may be a Linux based virtual machine running a NetFlow/IPFix compatible probe, such as nTop nProbe. In one embodiment, the networking device may restructure the raw connection data into a proper format for logging. For example, the networking device may restructure the raw connection data into a JSON standards compliant format. Such structured connection data 471 may be sent to the parser.

The parser may communicate with TTP data stores 440 to store parsed data 473. In one embodiment, parsed data may include parsed log data and parsed structured connections data. In one implementation, a connection may be established from the parser instance to the TTP data stores instance for each torrent server instance. For example, parsed data may be stored using one or more SQL queries.

The torrent server may communicate with the TTP data stores to transmit torrent parameters data 475. In one embodiment, the torrent server may send real-time statistics to the TTP data stores. For example, such real-time statistics may include connection data utilized to make immediate (e.g., substantially real-time) optimizations to the torrent server. In another embodiment, updated torrent parameters may be obtained from the TTP data stores. For example, such updated torrent parameters (e.g., optimizations) may specify changes to the torrent server with regard to torrent tracking, priority, bandwidth, and/or the like parameters (e.g., designated by a TTP user, designated by the TTP based on analysis of real-time statistics). In some implementations, such changes may be achieved by readjusting parameters of the firewall.

The torrent server may communicate with a load balancer 436. The load balancer may delegate responsibility for various torrents to various virtual machine instances of the torrent server and/or specify parameters for various virtual machine instances of the torrent server. In one embodiment, the torrent server may send load balancing data 477 to the load balancer. For example, such load balancing data may include connection data utilized to make optimizations to the torrent server. In another embodiment, the load balancer may send load balancing data to the torrent server. For example, such load balancing data may include updated torrent parameters (e.g., optimizations) for the torrent server. The load balancer may communicate with the TTP data stores to facilitate making optimizations. In one embodiment, the load balancer may send balancer parameters data 479 to the TTP data stores. For example, such balancer parameters data may include information regarding optimization changes made by the load balancer. In another embodiment, balancer parameters data may be obtained from the TTP data stores. For example, such balancer parameters data may include updated torrent parameters utilized by the load balancer to make optimizations to the torrent server.

An analysis server 444 may communicate with the TTP data stores. In various embodiments, the analysis server may handle analytics (e.g., utilized in a selected application), profile creation, load balancing, torrent piece analysis, DHT data analysis, network traffic verification, optimization recommendations, and/or the like duties. In one implementation, the analysis server may retrieve data from the TTP data stores, analyze such data, and store updated parameters in the TTP data stores for use by other TTP components. In one embodiment, the analysis server may retrieve profile data 481 and/or DHT data from the TTP data stores. For example, such profile data may include connection data utilized by the analysis server to create peer profiles. In another example, such DHT data may be utilized by the analysis server to determine swarm profiles (e.g., the number and/or locations of peers in a swarm). In another embodiment, the analysis server may send profile data to the TTP data stores. For example, such profile data may include peer profiles created by the analysis server. In another example, such profile data may include swarm profiles created by the analysis server.

A data cloud 450 may communicate with the TTP data stores to transmit cloud data 483. In one embodiment, TTP data (e.g., peer profiles) may be sent from the TTP data stores to the data cloud. For example, such data may be migrated between TTP instances to assist in load balancing and optimization based on geolocation. In another embodiment, other data (e.g., social media data, market specific data, general communication data) may be retrieved from the data cloud and stored in the TTP data stores. For example, such data may be utilized by the analysis server for analysis (e.g., in a selected application).

APPENDICES 1-2 illustrate additional exemplary embodiments of the TTP.

Detailed Description Of the TTP Coordinator

Figure 5:
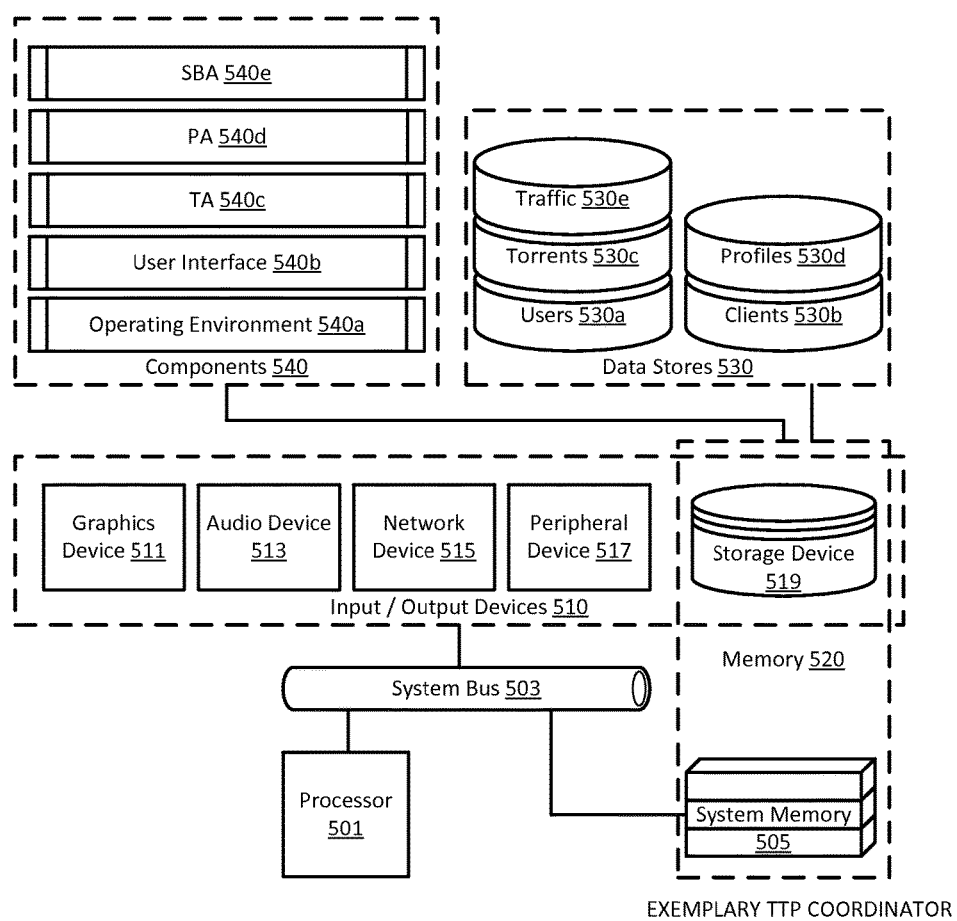
FIG. 5 shows a block diagram illustrating an exemplary TTP coordinator in one embodiment of the TTP.

FIG. 5 shows a block diagram illustrating an exemplary TTP coordinator in one embodiment of the TTP. The TTP coordinator facilitates the operation of the TTP via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the TTP coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the TTP coordinator may comprise a standalone computer system, a distributed computer system, a node in a computer network (i.e., a network of computer systems organized in a topology), a network of TTP coordinators, and/or the like. It is to be understood that the TTP coordinator and/or the various TTP coordinator elements (e.g., processor, system bus, memory, input/output devices) may be organized in any number of ways (i.e., using any number and configuration of computer systems, computer networks, nodes, TTP coordinator elements, and/or the like) to facilitate TTP operation. Furthermore, it is to be understood that the various TTP coordinator computer systems, TTP coordinator computer networks, TTP coordinator nodes, TTP coordinator elements, and/or the like may communicate among each other in any number of ways to facilitate TTP operation. As used in this disclosure, the term "user" refers generally to people and/or computer systems that interact with the TTP; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The TTP coordinator includes a processor 501 that executes program instructions (e.g., TTP program instructions). In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 505 via a system bus 503. The system bus may interconnect these and/or other elements of the TTP coordinator via electrical, electronic, optical, wireless, and/or the like communication links (e.g., the system bus may be integrated into a motherboard that interconnects TTP coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions (e.g., TTP program instructions) executed by the processor. The system memory may facilitate accessing, storing, retrieving, modifying, deleting, and/or the like data (e.g., TTP data) by the processor.

In various embodiments, input/output devices 510 may be connected to the processor and/or to the system memory, and/or to one another via the system bus.

In some embodiments, the input/output devices may include one or more graphics devices 511. The processor may make use of the one or more graphic devices in accordance with program instructions (e.g., TTP program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., TTP data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 513. The processor may make use of the one or more audio devices in accordance with program instructions (e.g., TTP program instructions) executed by the processor. In one implementation, an audio device may be a sound card that may obtain (e.g., via a connected microphone), process, output (e.g., via connected speakers), and/or the like audio data (e.g., TTP data). A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 515. The processor may make use of the one or more network devices in accordance with program instructions (e.g., TTP program instructions) executed by the processor. In one implementation, a network device may be a network card that may obtain (e.g., via a Category 5 Ethernet cable), process, output (e.g., via a wireless antenna), and/or the like network data (e.g., TTP data). A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 517. The processor may make use of the one or more peripheral devices in accordance with program instructions (e.g., TTP program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the TTP coordinator with a variety of input, output and processing capabilities.

In some embodiments, the input/output devices may include one or more storage devices 519. The processor may access, read from, write to, store in, erase, modify, and/or the like a storage device in accordance with program instructions (e.g., TTP program instructions) executed by the processor. A storage device may facilitate accessing, storing, retrieving, modifying, deleting, and/or the like data (e.g., TTP data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 505 and the one or more storage devices 519 may be referred to as memory 520 (i.e., physical memory).

TTP memory 520 contains processor-operable (e.g., accessible) TTP data stores 530. Data stores 530 comprise data that may be used (e.g., by the TTP) via the TTP coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, TTP coordinator elements, and/or the like) to facilitate TTP operation. For example, TTP data stores may comprise data stores 530a-e implemented as one or more databases. A users data store 530a may be a collection of database tables that include fields such as UserID, UserName, UserPreferences, and/or the like. A clients data store 530b may be a collection of database tables that include fields such as ClientID, ClientName, ClientDeviceType, ClientScreenResolution, and/or the like. A torrents data store 530c may be a collection of database tables that include fields such as TorrentID, TorrentFileName, TorrentHash, TorrentSize, TorrentNumberOfPieces, TorrentPeers, and/or the like. A profiles data store 530d may be a collection of database tables that include fields such as PeerID, PeerIPAddress, PeerTorrentClient, PeerLocation, PeerUploadInfo, PeerDownloadInfo, PeerContentInfo, PeerClassification, and/or the like. A traffic data store 530e may be a collection of database tables that include fields such as TransactionID, IPAddress, FileName, BytesSent, BytesReceived, and/or the like. The TTP coordinator may use data stores 530 to keep track of inputs, parameters, settings, variables, records, outputs, and/or the like.

TTP memory 520 contains processor-operable (e.g., executable) TTP components 540. Components 540 comprise program components (including program instructions and any associated data stores) that are executed (e.g., by the TTP) via the TTP coordinator (i.e., via the processor) to transform TTP inputs into TTP outputs. It is to be understood that the various components and their subcomponents, capabilities, applications, and/or the like may be organized in any number of ways (i.e., using any number and configuration of components, subcomponents, capabilities, applications, TTP coordinator elements, and/or the like) to facilitate TTP operation. Furthermore, it is to be understood that the various components and their subcomponents, capabilities, applications, and/or the like may communicate among each other in any number of ways to facilitate TTP operation. For example, the various components and their subcomponents, capabilities, applications, and/or the like may be combined, integrated, consolidated, split up, distributed, and/or the like in any number of ways to facilitate TTP operation. In another example, a single or multiple instances of the various components and their subcomponents, capabilities, applications, and/or the like may be instantiated on each of a single TTP coordinator node, across multiple TTP coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 540 may include an operating environment component 540a. The operating environment component may facilitate operation of the TTP via various subcomponents.

In some implementations, the operating environment component may include an operating system subcomponent. The operating system subcomponent may provide an abstraction layer that facilitates the use of, communication among, common services for, interaction with, security of, and/or the like of various TTP coordinator elements, components, data stores, and/or the like.

In some embodiments, the operating system subcomponent may facilitate execution of program instructions (e.g., TTP program instructions) by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the TTP. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the TTP coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the TTP coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the TTP by providing user interface elements that may be used by the TTP to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, Microsoft Windows 8, Apple Mac OS X, Apple iOS, Android, Symbian, Windows Phone 7, Windows Phone 8, Blackberry QNX, and/or the like.

In some implementations, the operating environment component may include a database subcomponent. The database subcomponent may facilitate TTP capabilities such as storage, analysis, retrieval, access, modification, deletion, aggregation, generation, and/or the like of data (e.g., the use of data stores 530). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, and/or the like.

In some implementations, the operating environment component may include an information handling subcomponent. The information handling subcomponent may provide the TTP with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, TTP components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 530) via the database subcomponent.

In some embodiments, the information handling subcomponent may facilitate presentation of information obtained from users, TTP components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate TTP message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, a custom protocol, and/or the like to facilitate TTP message communications. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates TTP security. In some embodiments, the security subcomponent may restrict access to the TTP, to one or more services provided by the TTP, to data associated with the TTP (e.g., stored in data stores 530), to communication messages associated with the TTP, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the TTP may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates TTP virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 540 may include a user interface component 540b. The user interface component may facilitate user interaction with the TTP by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 540 may include any of the components TA 540c, PA 540d, SBA 540e described in more detail in preceding figures.

The Embodiments of the TTP

The entirety of this disclosure (including the written description, figures, claims, abstract, appendices, and/or the like) for TRU TORRENT PLATFORM METHODS, APPARATUSES AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the TTP coordinator, TTP coordinator elements, TTP data stores, TTP components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the TTP coordinator, TTP coordinator elements, TTP data stores, TTP components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the TTP discussed in this disclosure have been directed to analyzing BitTorrent traffic, the innovations described in this disclosure may be readily applied to a wide variety of other fields and/or applications.

The following is claimed:

1. A torrent traffic analyzing and content management system, comprising:
a firewall device;
a torrent server device for serving a plurality of torrents;
an analysis server device;
wherein the firewall device is configured to control the number of peer to peer connections and bandwidth available for each of the peer to peer connections between the torrent server device and swarm peers of a swarm associated with a torrent from the plurality of torrent;
wherein the torrent server device is configured to monitor swarm peers using one or more virtual machine instances configured to act as peers of the swarm; and
wherein the analysis server device is configured to create profiles of swarm peers identifying their role in data collection or data distribution based on the monitoring, the profiles comprising analyses of data descriptive of the torrent, the system using the information to personalize delivery of content for an audience of the torrent.

2. The system of claim 1, wherein the analysis server device is further configured to predict swarm behavior based on the created swarm peer profiles.

3. The system of claim 1, wherein swarm peers are identified as seeders or leechers.

4. The system of claim 1, further comprising:
a load balancer device;
wherein the load balancer device specifies the number of virtual machine instances utilized by the torrent server device to monitor swarm peers of the swarm associated with the torrent.

5. The system of claim 4, wherein the load balancer device specifies the number of virtual machine instances utilized by the torrent server device to monitor swarm peers of another swarm associated with another torrent.

6. The system of claim 4, wherein the analysis server device is further configured to determine geographic locations of swarm peers of the swarm, and wherein the load balancer device is further configured to determine physical locations for the one or more virtual machine instances based on the determined geographic locations.

7. The system as in claim 1, wherein the analysis server device is further configured for:
cross referencing information regarding the predicted swarm behavior with other data, wherein the other data includes at least one of social media data, market specific data, general communication data; and
utilizing the cross referenced data for at least one of ad targeting, personalized content management, personalized content recommendations, understanding demand for content, understanding release timing, understanding how to focus marketing efforts, understanding value of licensing deals, understanding value of syndication.

8. A torrent traffic analyzing and content management processor-readable non-transitory physical medium storing processor-issuable instructions to:
determine via processor a torrent to monitor;
monitor via processor activity of a peer of a swarm associated with the torrent using one or more virtual machine instances;
implement a firewall device configured to control a number of peer to peer connections and bandwidth available for each of the peer to peer connections between a torrent server device and swarm peers of a swarm associated with the torrent;
create via processor a profile for the peer, wherein the profile includes data regarding the peer's traffic dynamics as well as information for a user to understand demand for content conveyed by the torrent; and
classify via processor the peer as a seeder or as a leecher based on the peer's profile;
cross reference information regarding swarm behavior with other data, wherein the other data includes at least one of social media data, market specific data, general communication data; and
use the cross referenced data for at least one of ad targeting, personalized content management, personalized content recommendations, understanding demand for content, understanding release timing, understanding how to focus marketing efforts, understanding value of licensing deals, understanding value of syndication.

9. The medium of claim 8, wherein the peer is not targeted for data collection and a single virtual machine instance is used to monitor the peer's activities.

10. The medium of claim 8, wherein the peer is targeted for data collection and a plurality of virtual machine instances is used to monitor the peer's activities.

11. The medium of claim 10, wherein the plurality of virtual machine instances are configured to look desirable to establish connection with to the targeted peer resulting in increased probability of connection with the targeted peer.

12. The medium of claim 8, wherein the peer is monitored to determine which torrent pieces the peer is downloading or uploading, and how long the peer makes torrent pieces available to other peers.

13. The medium of claim 8, further comprising instructions to include data regarding the peer obtained from social media sources into the peer's profile.

14. A processor-implemented method to analyze torrent traffic and manage content, comprising:
determining via processor a torrent to monitor;
implementing a firewall device configured to control a number of peer to peer connections and bandwidth available for each of the peer to peer connections between a torrent server device and swarm peers of a swarm associated with the torrent;
monitoring via processor peer activity of the swarm associated with the torrent using one or more virtual machine instances;
calculating via processor data collection or data distribution statistics for the swarm based on the monitoring;
creating via processor profiles for peers in the swarm based on their role in data collection or data distribution using the calculated statistics as well as information for a user to understand demand for content conveyed by the torrent;
predicting via processor swarm behavior based on the created peer profiles;
cross referencing information regarding the predicted swarm behavior with other data, wherein the other data includes at least one of social media data, market specific data, general communication data; and
utilizing the cross referenced data for at least one of ad targeting, personalized content management, personalized content recommendations, understanding demand for content, understanding release timing, understanding how to focus marketing efforts, understanding value of licensing deals, understanding value of syndication.

15. The method of claim 14, wherein the monitoring further comprises collecting data regarding download or upload speeds of peers in the swarm.

16. The method of claim 14, wherein the calculating further comprises calculating average download or average upload speeds for a group of peers in the swarm located in a geographic area.

17. The method of claim 14, wherein the creating further comprises:
    monitoring transactions of peers in the swarm; and
    classifying the peers in the swarm based on their role in data collection or data distribution.

18. The method of claim 17, wherein the peers are classified as seeders or leechers.

19. The method of claim 14, further comprising determining physical locations for the one or more virtual machine instances based on the predicted swarm behavior.

* * * * *